US008209290B1

(12) United States Patent
Dowers, II et al.

(10) Patent No.: US 8,209,290 B1
(45) Date of Patent: Jun. 26, 2012

(54) GENERIC GRANULAR RESTORE OF APPLICATION DATA FROM A VOLUME IMAGE BACKUP

(75) Inventors: Gregory R. Dowers, II, Lake Mary, FL (US); Kirk L. Searls, Maitland, FL (US)

(73) Assignee: Symantec Corporation, Mountain View, CA (US)

( * ) Notice: Subject to any disclaimer, the term of this patent is extended or adjusted under 35 U.S.C. 154(b) by 451 days.

(21) Appl. No.: 12/401,642

(22) Filed: Mar. 11, 2009

(51) Int. Cl.
*G06F 17/30* (2006.01)
(52) U.S. Cl. ........................................................ 707/640
(58) Field of Classification Search .................... 707/640
See application file for complete search history.

(56) References Cited

U.S. PATENT DOCUMENTS

| | | | | |
|---|---|---|---|---|
| 5,738,359 A | * | 4/1998 | Gundy | 277/606 |
| 5,765,173 A | * | 6/1998 | Cane et al. | 707/999.101 |
| 5,778,395 A | * | 7/1998 | Whiting et al. | 1/1 |
| 6,704,730 B2 | * | 3/2004 | Moulton et al. | 1/1 |
| 6,799,206 B1 | * | 9/2004 | Workman et al. | 709/223 |
| 6,799,258 B1 | * | 9/2004 | Linde | 711/162 |
| 6,839,819 B2 | * | 1/2005 | Martin | 711/162 |
| 6,938,136 B2 | * | 8/2005 | Garimella et al. | 711/162 |
| 6,988,124 B2 | * | 1/2006 | Douceur et al. | 709/203 |
| 7,085,904 B2 | * | 8/2006 | Mizuno et al. | 711/162 |
| 7,120,769 B2 | * | 10/2006 | Yagawa et al. | 711/162 |
| 7,185,340 B1 | * | 2/2007 | Hersh | 719/312 |
| 7,370,233 B1 | * | 5/2008 | Sobel et al. | 714/15 |
| 2004/0193969 A1 | * | 9/2004 | Nemoto et al. | 714/100 |
| 2005/0015415 A1 | * | 1/2005 | Garimella et al. | 707/204 |
| 2006/0015781 A1 | * | 1/2006 | Rothman et al. | 714/100 |
| 2006/0155676 A1 | | 7/2006 | Prahlad et al. | |
| 2006/0264534 A1 | | 11/2006 | Kathuria et al. | |
| 2008/0183775 A1 | | 7/2008 | Prahlad et al. | |
| 2009/0019308 A1 | | 1/2009 | Amano | |
| 2010/0274767 A1 | * | 10/2010 | Irisawa et al. | 707/654 |

* cited by examiner

*Primary Examiner* — Sheree Brown
(74) *Attorney, Agent, or Firm* — Meyertons Hood Kivlin Kowert & Goetzel, P.C.; Jeffrey C. Hood

(57) ABSTRACT

A system and method for generically performing a granular restore operation from a volume image backup. A volume image backup may be booted into a virtual environment. Input may be received selecting one or more application objects of an application on the volume image backup for restore. The selected application object(s) may be retrieved from the volume image backup by a first backup system agent on the volume image backup. The selected application object(s) may be sent from the first backup system agent to a second backup system agent on a restore target. The selected application object(s) may be restored on the restore target by the second backup system agent.

24 Claims, 5 Drawing Sheets

GENERIC GRANULAR RESTORE OF APPLICATION DATA FROM A VOLUME IMAGE BACKUP

FIELD OF THE INVENTION

The present invention relates generally to computer systems and more particularly to a system and method for generic granular restore of application data from a volume image backup.

DESCRIPTION OF THE RELATED ART

Computer systems, and their components, are subject to various failures which may result in the loss of data. For example, a storage device used in or by the computer system may experience a failure (e.g. mechanical, electrical, magnetic, etc.) which may make any data stored on that storage device unreadable. Erroneous software or hardware operation may corrupt the data stored on a storage device, destroying the data stored on an otherwise properly functioning storage device. Any component in the storage chain between (and including) the storage device and the computer system may experience failure (e.g. the storage device, connectors (e.g. cables) between the storage device and other circuitry, the network between the storage device and the accessing computer system (in some cases), etc.).

To mitigate the risk of losing data, computer system users typically make backup copies of data stored on various storage devices. One way of backing up a large amount of data, such as might be found on a server, is a volume image backup. A volume image backup of a server would provide a complete image of the server by backing up the server's volumes at a low level. Volume image backups provide a way to quickly and simply backup a large volume and require minimal storage space, however, they offer limited capability for granular restore of application objects that are at a higher level of granularity than simply files in the file system.

Some prior systems provide limited granular recovery capability from full backups for specific applications by reverse engineering the application's internal file structures. However, reverse engineering the file structures and developing specialized code for each application for which granular restore capability is desired requires significant development effort. Thus, improvements in the field are desired.

SUMMARY OF THE INVENTION

Embodiments of a system and method for generically performing a granular restore operation from a volume image backup. The method may include the following steps according to various embodiments.

A volume image backup of a computer system may be created, e.g., by a backup application. The volume image backup of the computer system may include an image of the entire contents of the computer system. The backup process may also generate catalog metadata, which may provide catalog information about the data on the image.

A volume image backup may be booted into a virtual environment. For example, the volume image backup may be mounted onto a virtual machine. In some embodiments a backup application (a "backup manager") may boot the volume image backup into the virtual environment. The backup manager may or may not be the same backup application that created the volume image backup, according to various embodiments. The volume image backup may include an image of the contents of a computer system, such as a server computer system. The image may include one or more applications, which may each include application files, which may contain application data and/or application objects. The image may also include agent software (which may be an application) of the backup manager. The image may include an operating system. Thus, when the volume image backup is booted in a virtual machine, the resulting virtual environment may simulate the operating environment in which the contents of the volume image backup originally operated.

Input may be received selecting one or more application objects on the volume image backup for restore. The selected application objects may in some embodiments be application objects at any level of granularity offered by a normal backup operation, including e.g., application objects or application data at a higher level of granularity than application files.

The input may be received by the backup manager. The input may be user input, e.g., may be input received by a user after a user may have browsed the application data and/or application objects on the volume image backup. In some embodiments the user may have browsed the application data and/or application objects via the backup manager, e.g., the backup manager may provide browsing functionality for the application data and/or application objects on the volume image backup. In some embodiments, the input may be received before the volume image backup is booted into the virtual environment. The input may also include a location to which the selected one or more application objects are to be restored, that is, a restore target.

The backup manager may interact with a first backup system agent in the virtual environment. The first backup system agent may be part of the volume image backup running in the virtual environment. The backup manager may instruct the first backup system agent, e.g., may provide input to the first backup system agent to perform a backup of the selected one or more application objects on the volume image backup. The first backup system agent may retrieve (e.g., extract) the selected one or more application objects from the application on the volume image backup. The first backup system agent may accomplish this by using live application programming interfaces (APIs), drivers, and/or any other tools available from the application itself in the virtual environment.

In some embodiments the first backup system agent may consider what it is performing to be a normal backup operation. The first backup system agent may send the selected one or more application objects to a second backup system agent on the restore target. The first backup system agent may send the selected application objects as a "backup stream", for example, if the first backup system agent believes it is performing a normal backup operation. The second backup system agent may be configured to recognize the "backup stream" as a restore stream and thus to receive and interpret the "backup stream" as a restore stream. In some embodiments, the first backup system agent may retrieve (or extract) only the selected one or more application objects from the application on the volume image backup. The "backup stream" may then include only the selected one or more application objects.

The second backup system agent may then restore the selected application objects to the corresponding application on the restore target. In one embodiment only the selected one or more application objects may be restored. The second backup system agent may perform this restore operation as a normal restore operation, e.g., just as if it were restoring granular data from a tape backup or normal backup on some other media, as is known in the art.

Other embodiments may include a computer-accessible memory medium including program instructions executable to perform some or all of the steps of the above described method. Thus one embodiment may include a computer-accessible memory medium comprising program instructions executable perform some or all of these steps in a similar manner as described above: booting a volume image backup into a virtual environment, providing browsing functionality to a user, receiving input selecting application object(s) on the volume image backup, and/or instructing a first backup agent on the volume image backup to retrieve (or extract) the selected application objects and send the selected application objects to a second backup system agent on a restore target.

Additional embodiments may include a computer system, including a processor and a memory medium, where the memory medium is the computer-accessible memory medium just described.

Another embodiment may include a computer-accessible memory medium including program instructions, where the contents of the memory medium may be backed up as part of a volume image backup. In this embodiment, as part of the volume image backup, the program instructions may be executable by a virtual processor in a virtual environment to receive instructions from an application outside of the virtual environment (such as a backup manager). The instructions from the outside application may be to retrieve (or extract) one or more application objects from an application on the volume image backup and send the one or more application objects to another application (such as a backup system agent) on another computer system (e.g., a restore target). The program instructions may then be executable to retrieve (or extract) the one or more application objects and send the one or more application objects to the other application on the other computer system.

Therefore, by loading a volume image backup into a virtual environment, existing backup/restore application implementations can be leveraged for the purpose of performing application granular restore from image backups.

Figure 1:
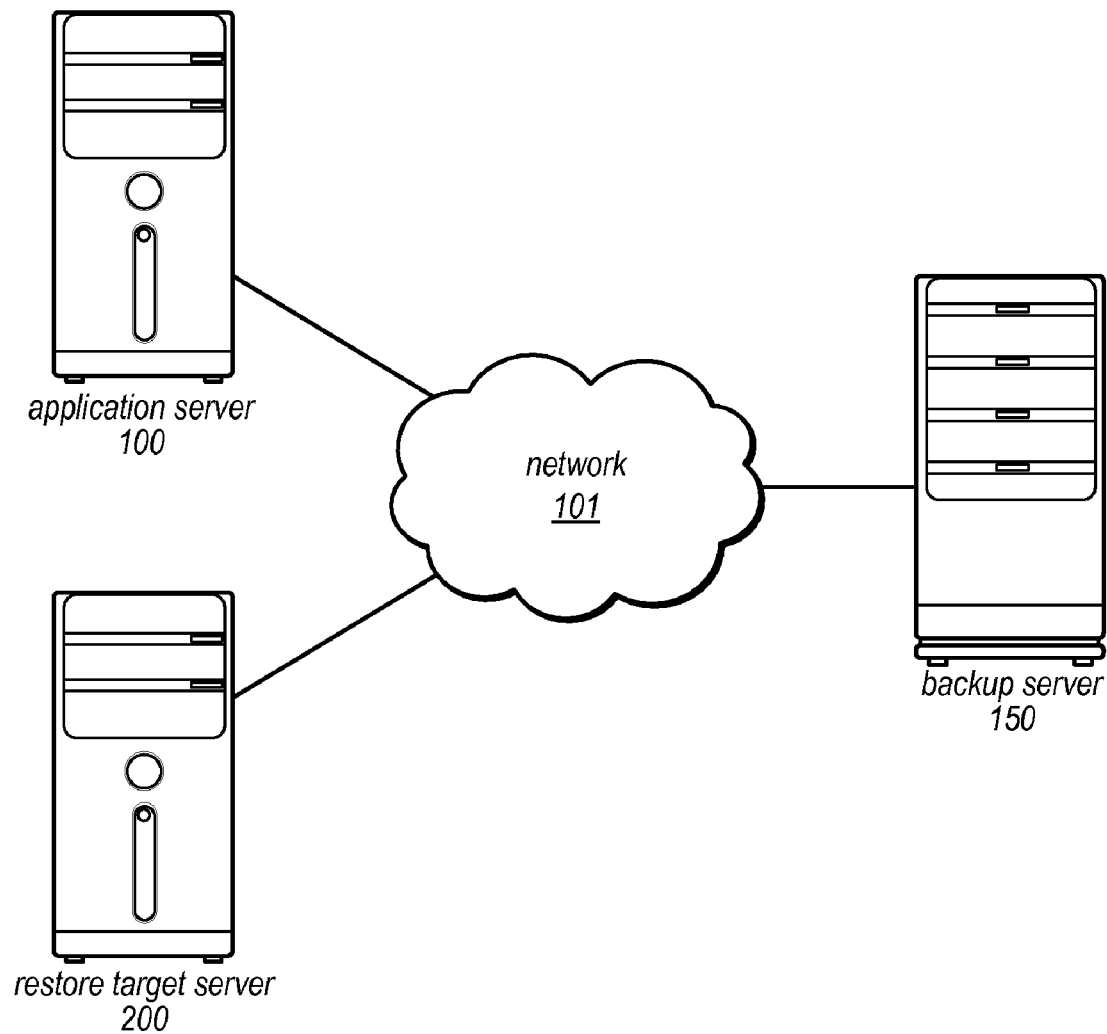
FIG. 1 illustrates servers connected over a network according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Terms

The following is a glossary of terms used in the present application:

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, and/or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

FIG. 1—Servers Connected Over a Network

FIG. 1 illustrates several servers connected over a network according to one embodiment. There may be an application server 100, a backup server 150, and a restore target server 200. In some embodiments the restore target server 200 may also be the application server 100, in other words, they may be the same server. The application server 100 and the backup server 150 may also be different servers, or alternatively they may be the same server. The servers may be connected over a network 101. The network 101 may be any of various types of networks, for example, local area network (LAN), or a wide area network (WAN). The network connection may be wired or wireless. There may also be other systems (e.g. computer systems) and/or devices also connected over the network 101; alternatively, there may only be the application server 100 and/or restore target server 200 and the backup server 150. While the detailed description below may refer to embodiments of the invention using servers, such as those shown in FIG. 1 and described herein, it should be noted that embodiments of the system and method claimed herein may be performed with any computer systems, and is not limited to server computer systems.

Figure 2:
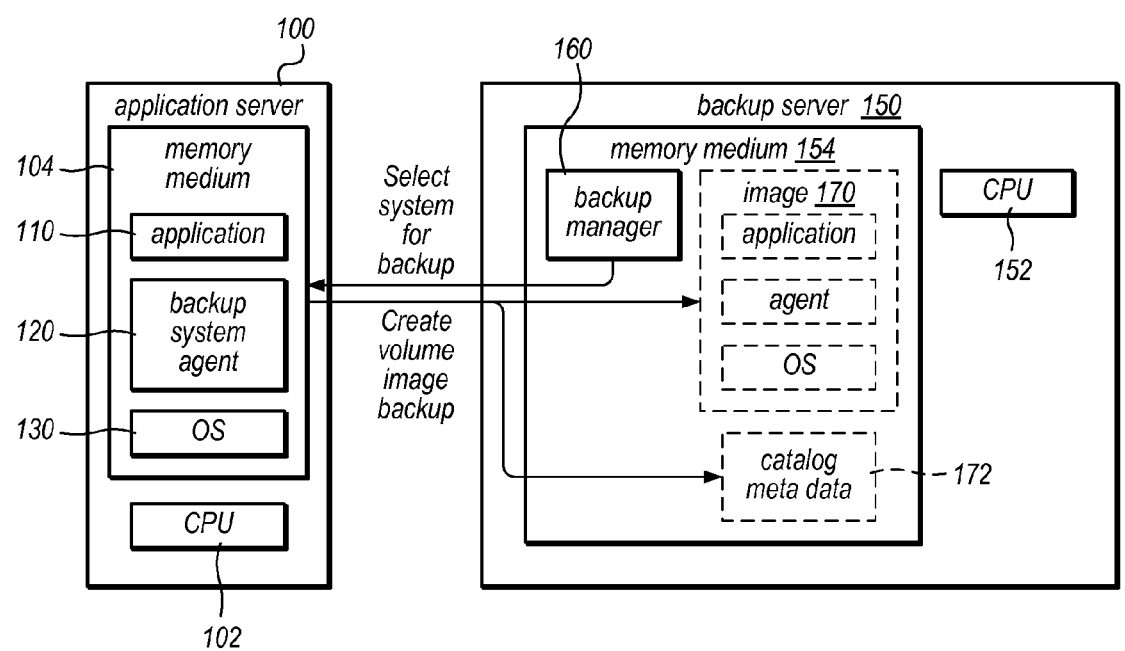
FIG. 2 is an exemplary block diagram illustrating an application server and a backup server according to one embodiment.

FIG. 2—Creating a Volume Image Backup

FIG. 2 illustrates an exemplary block diagram of an application server and a backup server according to one embodiment. The servers shown may be the servers of FIG. 1, e.g., in one embodiment they may be connected over a network 101. The backup server 150 may include a processor 152 and a memory medium 154. The backup server 150 may include a backup application 160 (a "backup manager"), e.g., program instructions stored on the memory medium 154 and executable by the processor 152 to perform one or more backup operations. Backup operations may include creating partial or full backups, e.g., on a computer system or from one computer system to another system; performing restore functions (e.g., partial or granular restore functions, or full restore functions) on a computer system or from one computer system to another computer system; backup operations may also include other operations.

The application server 100 may include a processor 102 and a memory medium 104. The application server 100 may contain one or more applications on its memory medium, such as application 110. The application server 100 may also contain backup system agent software 120 on the memory medium 104. The backup system agent 120 may be software configured to assist a backup manager, such as the backup manager 160 on the backup server 150, to perform one or more backup functions. In some embodiments the backup system agent 120 may also be configured to perform one or more backup functions independently of a backup manager. In some embodiments the application server 100 may also include an operating environment, e.g. an operating system, such as OS 130. The operating system may interface between the system hardware and the applications.

The backup manager 160 may be configured to create a volume image backup. In some embodiments, the backup manager may be configured to receive user input directing the backup manager to create a volume image backup of a specific system. In some embodiments, the backup manager may be configured to create a volume image backup of a specific system automatically, e.g., the backup manager may be scheduled to perform regular backups of a specific system. As one example, the backup manager 160 might create a volume image backup of the application server 100. The image 170 created may thus include images of the application 110, the backup system agent 120, and the OS 130, as well as any other software components on the application server. As part of creating the volume image backup of the application server 100, the backup manager 160 may also create catalog metadata 172 associated with the image 170. The catalog metadata 172 may include metadata for the image, e.g., metadata for application 110 and the other components of the image. The catalog metadata 172 may be usable for restore browsing, e.g., at a later time.

In one embodiment, the backup manager 160 may create the volume image backup and store it on the backup server 150, e.g., on a memory medium 154 of the backup server 150, as shown. In other embodiments, the backup manager 160 may instead store the volume image backup on another device, e.g., on another computer system (such as another server) connected over the network 101.

Figure 3A:
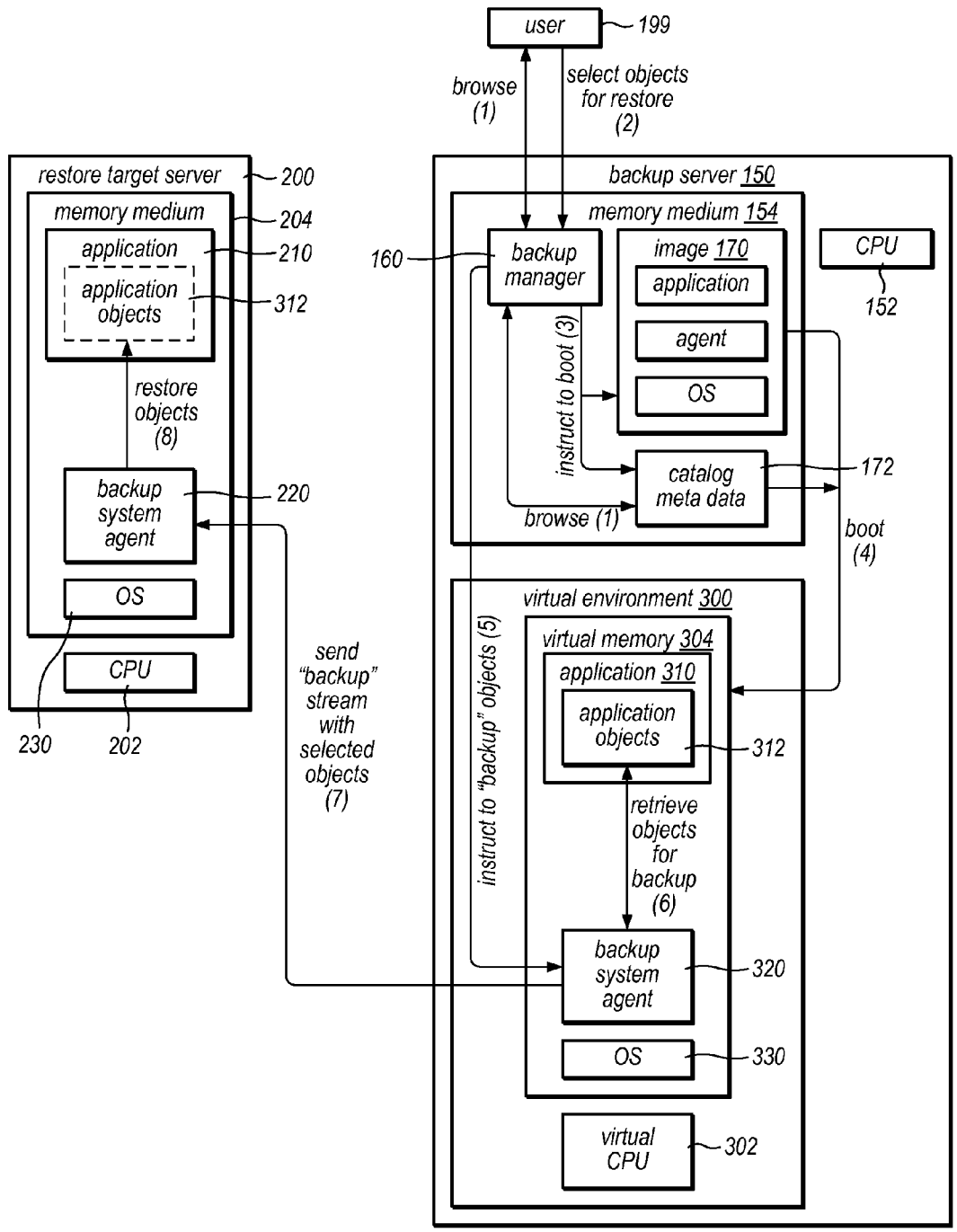
FIGS. 3A-3B are exemplary block diagrams illustrating embodiments of a backup server and a restore target.
Figure 3B:
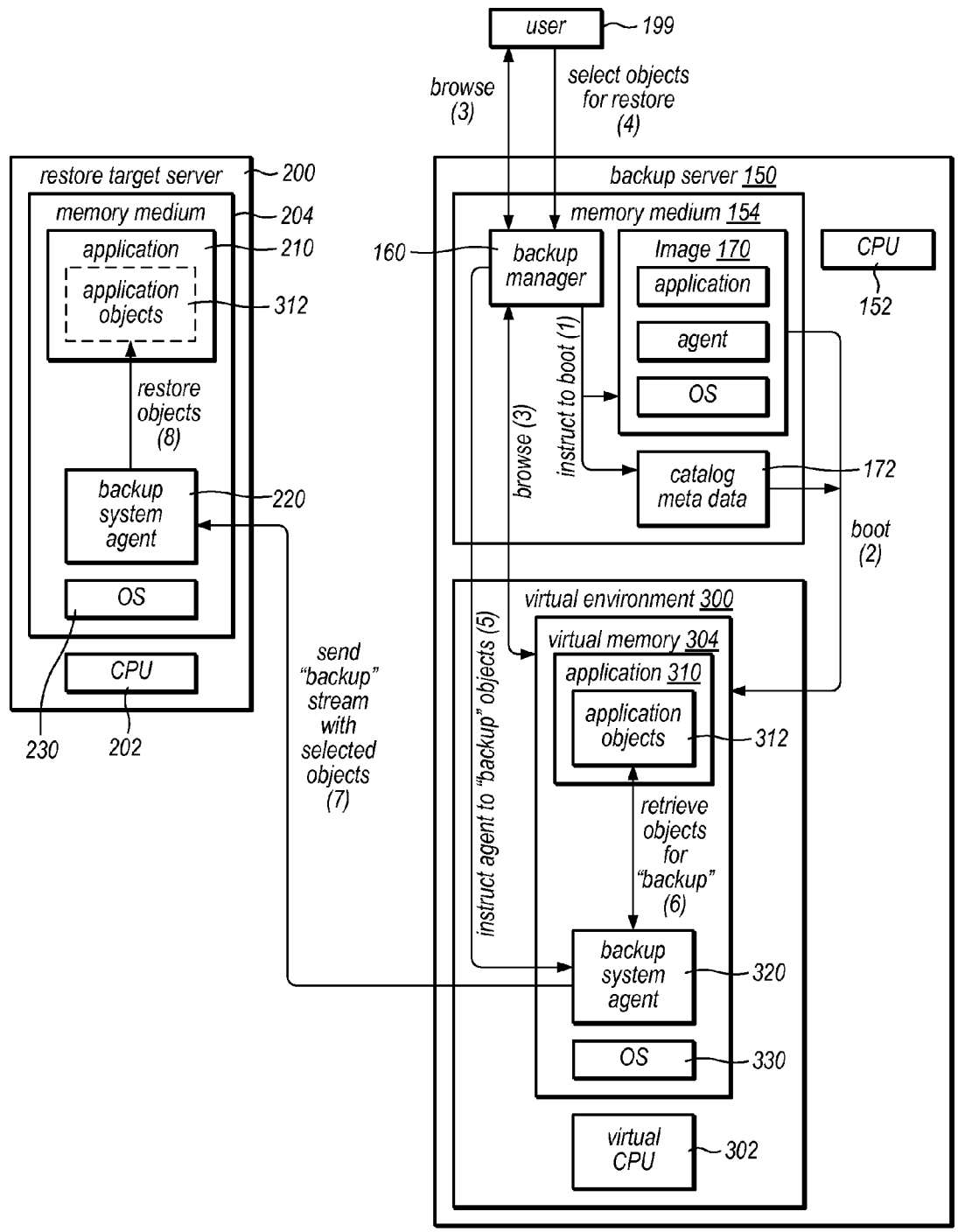

FIGS. 3A and 3B—Generically Performing Granular Restore from a Volume Image Backup FIGS. 3A and 3B are block diagrams depicting embodiments of a system for generically performing a granular restore operation from a volume image backup. The concept of granular restore from a volume image backup is the idea of performing a restore of individual application items from a full image backup of a computer system. It may be beneficial because it would allow a backup application to perform faster and more efficient backups (e.g., volume image backups) while still giving them full flexibility during restore to restore only what they need (e.g., granular restore).

There may be a backup server 150 and a restore target server 200. In some embodiments there may also be a user 199. The system for performing a granular restore operation from a volume image backup, generically (e.g., for any application, without relying on reverse engineering the application's internal file structures), may leverage traditional backup and restore capabilities of existing backup applications (such as Backup Exec from Symantec Corporation. For example, the system may utilize a virtual machine to access the operating environment of the system backed up by the volume image backup. In this way, a backup application included (e.g., backed up) on the volume image backup can perform what it believes is a normal backup operation on any application on the volume image backup by utilizing live APIs provided by the application, installable file systems, drivers, etc., within the virtual environment of the virtual machine. A backup manager may control the backup application in the virtual environment to manipulate the "backup" operation such that it is actually a restore operation, thereby generically performing a granular restore operation from the volume image backup. Several embodiments of this system are described below in conjunction with FIGS. 3A and 3B.

The backup server 150 may be the backup server 150 of FIGS. 1 and 2; alternatively, the backup server 150 may be a different backup server. The backup server may include a processor 152 and a memory medium 154. The backup server may include a backup manager 160, e.g., on the memory medium 154. In some embodiments the backup server may include a volume image backup, such as image 170 and associated catalog metadata 172. In other embodiments, the backup server 150 may be coupled to another system or device including a volume image backup, e.g., the backup server 150 may be coupled over network 101 to a system including a volume image backup. In some embodiments, the backup server may include one or more virtual machines (VMs). A VM may be a software implementation of a computer system that executes programs like a physical system. Alternatively, the backup server may be coupled to (e.g., over network 101) a VM (e.g., comprised in a physical system).

The restore target server 200 may be the application server 100 previously shown and described in FIGS. 1 and 2. For example, an application server such as application server 100 might at some point experience data loss. In such a case, the application server 100 might be targeted for one or more restore operations from a previously created volume image backup, and thus might be the restore target server 200. In other embodiments, the restore target server 200 might be a different server, e.g., a new and/or a replacement server. The restore target server 200 may include a processor 202 and a memory medium 204. The restore target may include an operating system, such as OS 230. The restore target server may include software, e.g., a backup system agent 220.

The restore target server may also include one or more software applications, such as application 210. Application 210 may be the same application as application 110 on the application server 100. In some embodiments, application 210 may not contain the identical application data as 110, e.g., may not be an identical copy. For example, the application server 100 may have experienced data loss or data corruption, or may simply have been updated with new data, creating a need to restore a particular piece of application data. In another embodiment, the application 210 may have been newly installed (or reinstalled) on the restore target server, and may require specific application data from a volume image backup.

In some embodiments, a user 199 may indicate to the backup manager 160 a desire to perform a granular restore from a volume image backup. The user may interact with the backup manager 160 via network 101, for example, via a computer system (e.g., including a display device and keyboard and/or mouse) coupled to the backup server 150 over the network 101. Alternatively, the user may interact with the backup manager 160 directly through the backup server. By interacting with the backup manager 160, the user 199 may be able to browse application data on the volume image backup. The backup manager 160 may be able to provide this browsing functionality in any of multiple ways. For example, the catalog metadata 172 of the volume image backup may include information about the contents of the volume image backup, and the backup manager 160 may be able utilize this information to enable a user 199 to browse application data. This is shown in one embodiment in FIG. 3A.

In another embodiment, e.g., if the catalog metadata doesn't provide sufficient information to enable this browsing functionality, the backup manager 160 may boot the volume image backup onto a virtual machine in order to provide browsing functionality. In other words, the volume image backup may be mounted to and used within a virtual environment 300, such as VMware Player™, such that the system (e.g., application server 100) from which the volume image backup was created may essentially be booted as a virtual machine. In various embodiments (e.g., depending on the format of the volume image backup) this may be done by directly mounting the image for use within a virtual environment, or by providing a translation layer between the volume image backup and the virtual environment, or even by converting the volume image backup to a bootable format. As used herein, booting a volume image backup onto a virtual machine may include any of these methods, and in general, any means by which a volume image backup may be made to run in a virtual environment and be controlled for use by a backup system such as backup manager 160.

The virtual environment 300 may thus include a virtual processor 302 and virtual memory medium 304, which may include application 310 and backup system agent 320, and may have an operating system OS 330. In one embodiment, each of these may mimic the corresponding components of the system from which they were backed up (e.g., processor 102 and memory medium 104 on application server 100, including application 110, backup system agent 120, and OS 130). As noted above, in one embodiment the volume image backup may be booted as just described before the backup manager 160 may be able to provide the user 199 the ability to browse application data from the volume image backup. In this embodiment, the backup manager 160 may provide browsing capability by interacting with the backup manager's 160 backup system agent 320 running in the virtual environment 300. This is shown in one embodiment in FIG. 3B After browsing, the user 199 may select one or more application objects, from one or more applications whose images form part of the volume image backup, to be restored. For example, the user may select application objects 312 in application 310. The application objects may in some embodiments be at any level of granularity offered by the backup manager's normal "backup" functions. In other words, the user may select any application objects (for any application) as if for a normal backup operation by the backup manager. Thus the application objects may in some embodiments be at a higher level of granularity than application files, e.g., may be information contained within application files. The user may also specify the restore target location, such as restore target server 200.

Once the one or more application objects 312 have been selected, the backup manager 160 may perform the restore operation. The backup manager 160 may perform the restore operation immediately, or alternatively, the backup manager 160 may wait a period of time before performing the restore operation. For example, the backup manager 160 may wait until a scheduled time, or it may wait until it detects that network traffic (e.g., over network 101) is reduced below a certain threshold, to begin performing the restore operation.

The backup manager may boot the volume image backup into a virtual environment (such as virtual environment 300), if it has not already done so (e.g., FIG. 3A). The backup manager may then instruct the backup system agent 320 operating in the virtual environment 300 to perform a "backup" of the selected one or more application objects (e.g., application objects 312). The backup system agent may then retrieve the selected applications objects 312 from application 310 and send a "backup stream" including the selected application objects 312 to the backup system agent 220 on the restore target server 200.

In one embodiment, the backup manager may instruct or otherwise communicate with the backup system agent 220 on the restore target server 200 in such a way as to assist in restoring the selected application objects 312 received in the "backup stream". In another embodiment, the backup system agent 220 on the restore target server 200 may recognize the "backup stream" as a "restore stream" and restore the selected application objects 312 independently of the backup manager 160. The backup system agent 220 on the restore target server may restore the selected application objects 312 to the application 210 as if performing a normal restore operation to restore data, e.g., as if restoring data from tape or some other medium. Thus, a granular restore operation may be performed from a volume image backup.

Figure 4A:
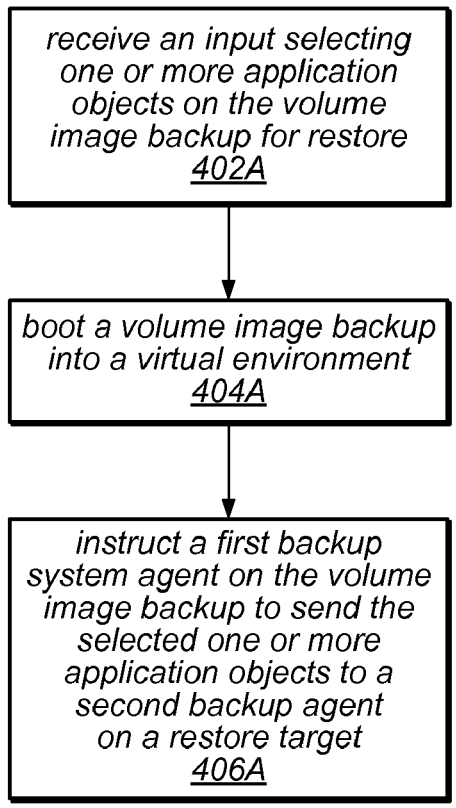
FIGS. 4A-4B are flowchart diagrams illustrating embodiments of a method for generically performing granular restore from a volume image backup.
Figure 4B:
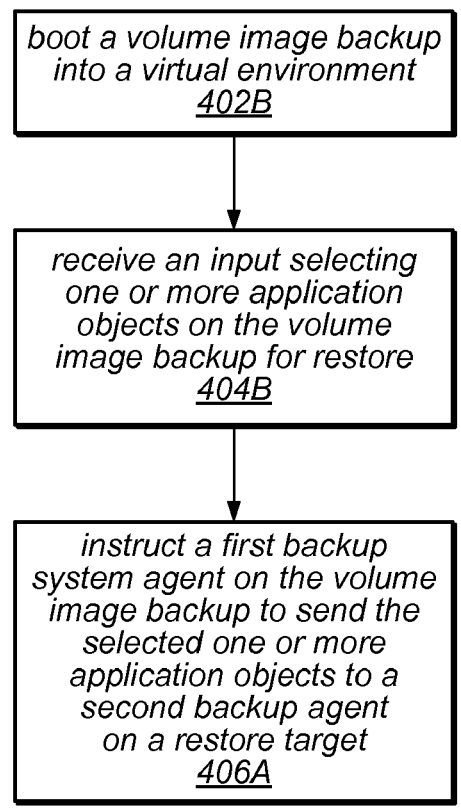

FIGS. 4A and 4B—Flowchart Diagram Depicting Embodiments of a Method for Generically Performing Granular Restore from a Volume Image Backup FIGS. 4A and 4B are flowchart diagrams depicting embodiments of a method for generically performing a granular restore operation from a volume image backup. Various embodiments may include a computer-accessible memory medium comprising program instructions executable to perform embodiments of the method described herein. Further embodiments may include a computer system, including a processor and a memory medium, where the memory medium comprises program instructions executable to perform embodiments of the method described herein. Embodiments of the method shown in FIGS. 4A and 4B may be performed in conjunction with one or more of the systems shown in FIGS. 2, 3A, and 3B in some embodiments. Embodiments of the method may be performed by backup system software, referred to herein as a backup manager.

The backup manager may first create the volume image backup from a computer system (a "first" computer system). The backup manager itself may be software executing on a "second" system, e.g., not on the system being backed up (although the system being backed up may also include backup software). The second computer system may in some embodiments be connected to the first computer system over a network. The system may be a server, for example an application server. The volume image backup may include an image of one or more applications, e.g., including application data. The volume image backup may also include a backup system agent, e.g, agent software of the backup manager. In some embodiments the volume image backup may include any other software on the computer system, such as an operating system. In other words, the volume image backup may be a complete image of a computer system's contents. The volume image backup may include the image of the computer system as well as catalog metadata. The catalog metadata may in some embodiments provide information usable by the backup manager to allow a user to browse through any application data on the volume image backup.

The backup manager may create the volume image backup on the second computer system (i.e., the computer system on which the backup manager is executing). Alternatively, the backup manager may create the volume image backup on another computer system (e.g., a "third" computer system). For example, the backup manager may create the volume image backup on a server dedicated to backing up other servers (a backup server); the backup manager software may or may not be located on the backup server in various embodiments.

In some embodiments, the backup manager may not create the volume image backup; for example, the volume image backup may have been created by other backup system software. In some embodiments, the backup manager may be able to generically perform granular restore operations from a volume image backup in any of a variety of formats, e.g., a volume image backup created by any of various kinds of backup system software.

Once the volume image backup has been created, it may be stored on a computer system (e.g., on the second computer system with the backup manager or on a third computer system). At some later time, it may be desirable to restore a portion of the volume image backup. That is to say, it may be desirable to perform a granular restore of some portion of application data from the volume image backup to another computer system (a "restore target"). The restore target may be the first computer system (e.g., the system from which the volume image backup was originally made), or may be another computer system.

The backup manager may provide functionality for browsing any application data on the volume image backup. The backup manager may provide this functionality in any of multiple ways. For example, as noted above, the catalog metadata created with the volume image backup may include information to enable browsing the application data on the volume image backup. Thus in one set of embodiments, the backup manager may allow a user may be able to browse the application data to select any application objects to be restored simply by accessing the catalog metadata for the volume image backup. These embodiments are represented by FIG. 4A.

FIG. 4A

In 402A, the backup manager may receive an input selecting one or more application objects on the volume image backup for restore. The input may be a user input; for example, a user may browse through the application data as provided by the browsing functionality of the backup manager, and may select the one or more application objects based on this browsing. The input may also include a location to which to restore the application objects. In other words, the user may also select the restore target. The backup manager may immediately perform the restore operation after the application objects have been selected, or may wait a period of time before restoring the application objects. In one embodiment, the backup manager may wait until detecting a period of reduced network activity, if the backup manager will be performing the restore operation over a network. Alternatively, the backup manager may wait until a scheduled time to perform the restore operation; for example, if multiple restore operations are requested over the course of a work day, the backup manager may wait until after the work day is over and perform all restore operations at that time.

In 404A, the backup manager may boot the volume image backup into a virtual environment. When the backup manager does begin performing the restore operation, either immediately or after a period of time, the backup manager may boot the volume image backup into a virtual environment, e.g., operating on a virtual machine (VM). In other words, the volume image backup may be mounted to a VM, such as VMware Player™, such that the computer system from which the volume image backup was created may essentially be booted as a virtual machine. As noted above with respect to FIGS. 3A and 3B, in various embodiments (e.g., depending on the format of the volume image backup) this may be done by directly mounting the image for use within a virtual environment, or by providing a translation layer between the volume image backup and the virtual environment, or even by converting the volume image backup to a bootable format.

The virtual environment may thus include a virtual processor and a virtual memory medium, which may include the one or more applications and any other components that were originally on the backed up computer system, such as the backup manager's agent software. Thus, each of these components may mimic the corresponding components of the system from which they were backed up, such that the virtual environment provides the same functionality as the original operating environment.

The VM may in some embodiments be configured to not modify the volume image backup itself when booting the volume image backup into the virtual environment. In one embodiment, any changes may be placed in new, separate files alongside the original image files rather than modifying them. Thus the original backup image files may remain unchanged and the changes caused by booting may afterwards be discarded. It should further be noted that any data which might be modified when booting the volume image would likely be internal application metadata. Any user data, such as would be suitable for granular restore operations, should not be modified by booting the volume image backup into a virtual environment.

The virtual environment may mimic the original (backed up) system's operating environment. In other words, the virtual environment may be able to exactly match the details of the backed up system's operating environment, including, for example, details such as the version of the operating system or whether it is a 32 bit or a 64 bit operating environment. The first backup system agent may be executing in this virtual environment just as if it were on the original system. Thus, the first backup system agent may be able to access any drivers, installable file systems, and/or APIs provided by the applications themselves, and may therefore be able to perform a backup operation for any application on the volume image backup, provided that the application is supported for normal backup by the backup system.

In 406A, the backup manager may instruct a first backup system agent on the volume image backup to send the selected application objects to a second backup system agent on the restore target. As noted above, once the volume image backup is booted into the VM and running in the virtual environment, the first backup agent may be able to perform normal backup operations for the applications on the volume image backup (e.g., which may also be running in the virtual environment). For example, the first backup agent may be able to backup application objects at a high level of granularity, such as application data within application files. Thus, the backup manager may be able to instruct (e.g., provide input to) the backup system agent to backup the selected one or more application objects to the restore target. The backup system agent may then initiate and perform a normal backup operation, including, for example, calling any application APIs for the application in which the selected application objects are located, using the APIs to extract the selected application objects, and sending a "backup stream" including the selected application objects to the second backup system agent located on the restore target. The "backup stream" may be sent over to from the first backup system agent on the VM to the second backup agent on the restore target over a network.

The second backup system agent may be configured to recognize and receive the "backup stream" from the first backup system agent. The second backup system agent may further be configured to interpret the "backup stream" as a restore stream, e.g., may recognize that it contains application objects to be restored to an application on the restore target. The second backup system agent may then perform a normal restore operation such as might be performed under ordinary conditions from a traditional backup on tape, disks, or some other media, restoring the selected application objects to the corresponding application on the restore target.

FIG. 4B

In another set of embodiments, the catalog metadata may not include sufficient information to enable browsing the application data on the volume image backup. The contents of the catalog metadata may depend on the backup system software that created the volume image backup, and/or the format in which the volume image backup was created; not all formats or backup systems may include such comprehensive catalog metadata. Thus in these embodiments, the backup manager may first boot the volume image backup into a VM. This is shown in FIG. 4B, and described below.

In 402B, the backup manager may boot the volume image backup into a virtual environment. This may be done in a similar way as previously described. Once the volume image backup is running in the virtual environment, the backup manager may be able to interact with the first backup system agent on the volume image backup. As noted above, the first backup system agent may have the identical functionality while running in the virtual environment as on the original (backed up) system. Thus, the first backup system agent may have the capability to browse application data (e.g., using live APIs provided by the applications themselves) as for normal backup and/or restore browsing. Thus, by interacting with the first backup system agent, the backup manager may be able to provide browsing functionality, e.g., to a user. The user may browse through application data for any applications on the volume image backup to whatever level of granularity offered by the backup system for normal (traditional) backup and restore operations.

The backup manager may then receive an input (e.g., from the user) selecting one or more application objects from one or more applications on the volume image backup for restore (step 404B). In some embodiments, the remaining step(s) of this method may be performed as described above with respect to FIG. 4A. Thus 406A of FIG. 4B may be performed in any of the ways described with respect to 406A of FIG. 4A above.

Advantages of the Method

In one embodiment the method may leverage existing code in a backup application to perform a requested restore. As noted above, booting a volume image backup into a virtual machine may allow a backup system agent on the volume image backup to use its traditional backup and restore capabilities to generically perform a granular restore operation (for any application supported for normal backup/restore operations) from the volume image backup. In particular, the method may allow granular restore at a granularity higher than application files, e.g., application objects within application files.

Since many backup applications already provide normal (traditional) backup/restore functionality for a wide range of applications, this may significantly reduce the amount of time that would otherwise be required to develop the ability to perform granular restore operations from a volume image backup for the same range of applications. This is because in the prior art, providing granular restore capability for any given application from a volume image backup required significant developmental effort to reverse engineer the given application's file structures and otherwise reproduce the ability to extract application data without the use of the application's own APIs. In other words, in this method, since the backup system agent on the volume image backup can access live application APIs in the virtual environment, the extra developmental effort for each individual application is saved.

In addition, the method may be implemented in such as way as to allow this generic granular restore ability via normal workflow within the backup manager. In other words, since the backup manager provides the browsing functionality to the user, boots the volume image backup into the virtual machine, and controls the first backup system agent running in the virtual environment, the user may be provided this capability to perform generic granular restore from a volume image backup in the same operational workflow (e.g., using the backup manager) as for any other backup or restore operation for any computer system managed by the backup manager.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method to generically perform a granular restore from a volume image backup, comprising:
    booting the volume image backup into a virtual environment, wherein the volume image backup comprises an image of the entire contents of a computer system, wherein the volume image backup comprises a first backup system agent, wherein the virtual environment comprises a virtual processor configured to execute program instructions comprised on the volume image backup;
    receiving input selecting one or more application objects of an application on the volume image backup for restore, wherein the one or more application objects comprise application data at a higher level of granularity than application files;
    retrieving the selected one or more application objects from the volume image backup, wherein said retrieving is performed by the first backup system agent executing on the virtual processor within the virtual environment, wherein said retrieving comprises utilizing at least one live API provided by an application comprised on the volume image backup, wherein the at least one live API executes on the virtual processor within the virtual environment;
    sending the selected one or more application objects from the first backup system agent to a second backup system agent on a restore target;
    restoring the selected one or more application objects on the restore target, wherein said restoring is performed by the second backup system agent.

2. The method of claim 1,
    wherein the volume image backup comprises an operating environment of the computer system, wherein the virtual environment simulates the operating environment of the computer system.

3. The method of claim 1,
    wherein the input comprises a user input.

4. The method of claim 1, further comprising:
    creating the volume image backup of the computer system.

5. The method of claim 1, further comprising:
    creating the volume image backup of the computer system;
    wherein the restore target is the computer system.

6. The method of claim 1,
wherein said retrieving, sending, and restoring the selected one or more application objects comprises retrieving, sending, and restoring only the selected one or more application objects.

7. A non-transitory computer accessible memory medium comprising program instructions for generically performing a granular restore from a volume image backup, wherein the program instructions are executable by a processor to:
boot the volume image backup into a virtual environment, wherein the volume image backup comprises a first backup system agent, wherein the virtual environment comprises a virtual processor configured to execute program instructions comprised on the volume image backup;
receive input selecting one or more application objects of an application on the volume image backup for restore, wherein the one or more application objects comprise application data at a higher level of granularity than application files;
instruct the first backup system agent comprised on the volume image backup to retrieve the selected one or more application objects from the volume image backup, wherein said retrieving is performed by the first backup system agent executing on the virtual processor within the virtual environment, wherein said retrieving comprises utilizing at least one live API provided by an application comprised on the volume image backup, wherein the at least one live API executes on the virtual processor within the virtual environment;
instruct the first backup system agent to send the selected one or more application objects to a second backup system agent comprised on a restore target to restore the one or more application objects on the restore target.

8. The non-transitory computer accessible memory medium of claim 7,
wherein the volume image backup comprises a volume image backup of a computer system comprising an operating environment, and wherein the virtual environment simulates the operating environment of the computer system.

9. The non-transitory computer accessible memory medium of claim 7,
wherein the input comprises a user input.

10. The non-transitory computer accessible memory medium of claim 7, wherein the program instructions are further executable by a processor to:
create the volume image backup of a computer system.

11. The non-transitory computer accessible memory medium of claim 7, wherein the program instructions are further executable by a processor to:
create the volume image backup of a computer system;
wherein the restore target is the computer system.

12. The non-transitory computer accessible memory medium of claim 7,
wherein the second backup system agent is configured to restore the selected one or more application objects to a corresponding application on the restore target.

13. The non-transitory computer accessible memory medium of claim 7,
wherein said instructing the first backup system agent to retrieve and send the selected one or more application objects comprises instructing the first backup system agent to retrieve and send only the selected one or more application objects.

14. A backup system configured to generically perform a granular restore from a volume image backup, the system comprising:
a processor;
a memory medium comprising program instructions executable by the processor to:
boot the volume image backup into a virtual environment, wherein the volume image backup comprises an image of the entire contents of a computer system, wherein the volume image backup comprises a first backup system agent, wherein the virtual environment comprises a virtual processor configured to execute program instructions comprised on the volume image backup;
receive input selecting one or more application objects of an application on the volume image backup for restore, wherein the one or more application objects comprise application data at a higher level of granularity than application files;
instruct the first backup system agent comprised on the volume image backup to retrieve the selected one or more application objects from the volume image backup, wherein said retrieving is performed by the first backup system agent executing on the virtual processor within the virtual environment, wherein said retrieving comprises utilizing at least one live API provided by an application comprised on the volume image backup, wherein the at least one live API executes on the virtual processor within the virtual environment;
instruct the first backup system agent to send the selected one or more application objects to a second backup system agent comprised on a restore target to restore the selected one or more application objects on the restore target.

15. The backup system of claim 14,
wherein the second backup system agent is configured to restore the selected one or more application objects to a corresponding application on the restore target.

16. The backup system of claim 14,
wherein said instructing the first backup system agent to retrieve and send the selected one or more application objects comprises instructing the first backup system agent to retrieve and send only the selected one or more application objects.

17. A non-transitory computer-accessible memory medium comprising program instructions, wherein contents of the memory medium may be backed up as part of a volume image backup, wherein the volume image backup comprises an image of the entire contents of a computer system, wherein as part of the volume image backup, the program instructions are executable by a virtual processor in a virtual environment to:
receive instructions from a first application, wherein the first application is operating outside the virtual environment, wherein the instructions comprise instructions to retrieve one or more application objects of a second application, wherein the one or more application objects comprise application data at a higher level of granularity than application files, wherein the second application is comprised on the volume image backup, and send the one or more application objects to a third application;
retrieve the one or more application objects, wherein said retrieval occurs within the virtual environment, wherein said retrieval comprises utilizing at least one live API provided by an application comprised on the volume image backup, wherein the at least one live API executes on the virtual processor within the virtual environment;
send the one or more application objects to the third application to restore the selected one or more application objects on a restore target computer system, wherein the third application is comprised on the restore target computer system.

18. The non-transitory computer-accessible memory medium of claim 17,
wherein said retrieving and sending the one or more application objects comprises retrieving and sending only the selected one or more application objects.

19. The method of claim 1, further comprising:
providing browsing functionality for application data comprised in the volume image backup to a user;
wherein the input selecting one or more application objects of an application on the volume image backup for restore comprises user input selecting the one or more application objects via the browsing functionality.

20. The method of claim 1, further comprising:
receiving user input indicating a computer system as the restore target.

21. The method of claim 1,
wherein the at least one live API is provided by an application associated with the selected one or more application objects.

22. The non-transitory computer accessible memory medium of claim 7, wherein the program instructions are further executable by a processor to:
provide browsing functionality for application data comprised in the volume image backup to a user;
wherein the input selecting one or more application objects of an application on the volume image backup for restore comprises user input selecting the one or more application objects via the browsing functionality.

23. The non-transitory computer accessible memory medium of claim 7, wherein the program instructions are further executable by a processor to:
receive user input indicating a computer system as the restore target.

24. The non-transitory computer accessible memory medium of claim 7, wherein the volume image backup comprises an image of the entire contents of a computer system.

\* \* \* \* \*